(12) United States Patent
Wolfgang et al.

(10) Patent No.: US 8,165,763 B2
(45) Date of Patent: Apr. 24, 2012

(54) METHOD FOR CONTROLLING SHIFTING OF A STEPPED AUTOMATIC TRANSMISSION

(75) Inventors: Werner Wolfgang, Ravensburg (DE);
Maik Wurthner, Friedrichshafen (DE);
Ingo Sauter, D-Aberdeen, NC (US)

(73) Assignee: ZF Friedrichshafen AG, Friedrichshafen (DE)

( * ) Notice: Subject to any disclaimer, the term of this patent is extended or adjusted under 35 U.S.C. 154(b) by 680 days.

(21) Appl. No.: 12/226,174

(22) PCT Filed: Apr. 2, 2007

(86) PCT No.: PCT/EP2007/053139
§ 371 (c)(1),
(2), (4) Date: Oct. 9, 2008

(87) PCT Pub. No.: WO2007/118783
PCT Pub. Date: Oct. 25, 2007

(65) Prior Publication Data
US 2009/0265067 A1 Oct. 22, 2009

(30) Foreign Application Priority Data
Apr. 15, 2006 (DE) .......... 10 2006 017 712

(51) Int. Cl.
G06F 7/00 (2006.01)
G06F 17/00 (2006.01)
G06F 19/00 (2011.01)
(52) U.S. Cl. ........................................ 701/58
(58) Field of Classification Search ............. 701/51, 701/54, 55, 58; 180/269
See application file for complete search history.

(56) References Cited

U.S. PATENT DOCUMENTS

| 5,730,682 A * | 3/1998 | Depping et al. ............. 477/120 |
| 5,995,896 A | 11/1999 | Depping et al. |
| 6,154,701 A | 11/2000 | Löffler et al. |
| 6,246,942 B1 | 6/2001 | Dobler et al. |
| 6,456,919 B1 | 9/2002 | Körner et al. |
| 7,680,575 B2 * | 3/2010 | Han et al. ........................ 701/51 |
| 2005/0143221 A1 * | 6/2005 | Kuwahara et al. ............. 477/97 |
| 2006/0142918 A1 * | 6/2006 | Guggolz et al. ................ 701/51 |
| 2006/0155450 A1 * | 7/2006 | Aubert ............................. 701/51 |
| 2009/0265067 A1 * | 10/2009 | Wolfgang et al. ............... 701/58 |

FOREIGN PATENT DOCUMENTS

| DE | 196 38 064 A1 | 3/1998 |
| DE | 197 03 561 A1 | 8/1998 |
| DE | 197 03 863 A1 | 8/1998 |
| DE | 10 2004 002 813 A1 | 8/2005 |
| WO | WO-00/31442 | 6/2000 |

* cited by examiner

Primary Examiner — James Trammell
Assistant Examiner — Michael D Lang
(74) Attorney, Agent, or Firm — Davis & Bujold, P.L.L.C.

(57) ABSTRACT

A method for controlling gear shifts in an automated stepped gear transmission of a motor vehicle in which operating parameters of the motor vehicle are continuously determined and evaluated for initiating and carrying out a shift from a currently engaged gear to a target gear such that, before a shift, the shift speed for initiating the shift and the target gear are determined. For better adaptation of the shift, in particular the determination of the shift speed and the target gear, to the current driving and operating conditions of the motor vehicle, the shift types "shift-speed-orientated shift" and "target-speed-orientated shift" are provided and, immediately before a shift operation, it is decided, as a function of at least one of the operating parameters in which, of the two shift types, the shift is to be carried out.

14 Claims, 2 Drawing Sheets

_US 8,165,763 B2_

METHOD FOR CONTROLLING SHIFTING OF A STEPPED AUTOMATIC TRANSMISSION

This application is a national stage completion of PCT/EP2007/053139 filed Apr. 2, 2007, which claims priority from German Application Serial No. 10 2006 017 712.6 filed Apr. 15, 2006.

FIELD OF THE INVENTION

The invention concerns a method for controlling gear shifts in an automated stepped gear transmission of a motor vehicle, in which operating parameters of the motor vehicle are continuously monitored and in each case evaluated for the purpose of initiating and carrying out a shift from a currently engaged gear to a target gear, such that before any shift, in each case, the shift speed for initiating the gear shift and the target gear are determined.

BACKGROUND OF THE INVENTION

To initiate and carry out a transmission gear shift, it is first necessary to determine the speed of the drive engine at which the shift should begin, known as the shift speed, and the target gear into which the shift should be made from the gear currently actually engaged. For this purpose, it is usual for operating parameters of the motor vehicle, such as the current driving speed, the current acceleration or deceleration of the motor vehicle, the current rotation speed of the drive engine (engine speed), the load condition or torque of the drive engine, the accelerator pedal position, the change or rate of change of the accelerator pedal position, the actuation of a kick-down switch; if necessary, also the actuation of a vehicle brake, the current driving resistance, in particular in the case of commercial vehicles also the loading condition or mass of the motor vehicle and the inclination of the road, either to be determined directly by corresponding sensors or calculated by the evaluation of control magnitudes, in particular of the drive engine, and/or of the measured values of other operating parameters.

In determining the shift speed and the target gear, a distinction is generally made between a "shift-speed-orientated shift" and a "target-speed-orientated shift".

For a "shift-speed-orientated shift" the shift speed, i.e., the engine speed at which the gear shift should take place or be initiated, is first determined as a function of relevant operating parameters. Then a gear step appropriate for the momentary driving situation and, in particular the momentary vehicle acceleration is determined and hence, starting from the gear currently engaged, the target gear to which the transmission is to be shifted is identified.

The advantage of a "shift-speed-orientated shift" consists in the relatively spontaneous reaction of the automated stepped gear transmission to changing operation conditions and to commands input by the driver. For example, when moving from flat ground onto a rising slope with a corresponding increase of the driving resistance and sometimes a deceleration of the motor vehicle, a downshift is initiated relatively quickly. Likewise, when the kick-down switch is actuated, via the accelerator pedal, to initiate the kick-down function, an immediate downshift takes place as expected by the driver, since in such a case the current engine speed is regarded as the shift speed. In motor vehicles for whose stepped gear transmissions more than one shift program is available, for example an ecological mode and a sporty mode, the shift speed and the target gear are also influenced by the shift program that is active at the time. Thus, when the ecological mode is active, to achieve low fuel consumption the shift speed is generally lower than in the sporty mode, in the latter of which the achievement of high drive dynamics is paramount.

In contrast, in a "target-speed-orientated shift" the target speed, i.e., the engine speed that should exist after a shift operation, is determined first. Starting from this, a suitable gear step from the current actually engaged gear, and hence the target gear and the shift speed, are determined as a function of current operating parameters, in particular the acceleration of the vehicle. The advantage of a "target-speed-orientated shift" consists in the possibility of being able to operate the drive engine within an optimum speed range, in particular one that is favorable for consumption, under any operating conditions.

A method for a "target-speed-orientated shift" is described in DE 196 38 064 C2. In that document, for an upshift to the next-higher gear it is provided that to reach the same target gear, when driving with low load and high acceleration a shift is initiated at a lower shift speed and, when driving with a high load and low acceleration, it is initiated at a higher shift speed.

In both shift types, respective speed limits must be complied with, namely in a "shift-speed-orientated shift", a target speed limit and in a "target-speed-orientated shift", a shift speed limit, in order to keep the engine speed and therefore the desired operating behavior of the drive engine within a desired range, for example with low fuel consumption and/or a high traction force of the drive engine. In extreme cases, these speed limits can be identical to the engine speed limits, i.e., the acceptable minimum speed and the acceptable maximum speed of the drive engine, however, they are usually inside those engine speed limits.

Since in the known methods for controlling gear shifts of automated stepped gear transmissions, in each case only one shift type is envisaged. The possibilities for adapting to the respective existing driving or operating situation are insufficiently utilized. Thus, the purpose of the present invention is to indicate a method of the type mentioned at the start, with which gear shifts, in particular the determination of shift speed and target gear, can be better adapted to the driving or operating situation at the time.

SUMMARY OF THE INVENTION

Thus, a method for controlling gear shifts in an automated stepped gear transmission of a motor vehicle, in which operating parameters are continuously detected and, in each case, evaluated for the purpose of initiating and carrying out a shift from a currently engaged gear to a target gear, such that before any shift, in each case, the shift speed for initiating the gear shift and the target gear are determined.

In addition, in this method the shift types "shift-speed-orientated shift" and "target-speed-orientated shift" are both available and it is decided immediately before a shift, as a function of at least one of the operating parameters, by which of the two shift types the gear shift is to be carried out.

Thanks to the availability of the two shift types the respective shift can be adapted better to existing operating conditions, in particular to the current driving resistance, the current load condition of the drive engine and the driver's current power demand. Thus, depending on the driving situation and the driver's power demand, it is possible to achieve optimum driving dynamics or low fuel consumption of the motor vehicle.

To determine the current driving situation and an optimum adaptation of the gear shifts, it is expediently provided that the driving resistance of the motor vehicle is monitored continuously while driving and that, when the driving resistance is low, a gear shift is carried out as a "target-speed-orientated shift" and, when the driving resistance is high, the shift is carried out as a "shift-speed-orientated shift". In this way, the circumstance is taken into account that when the driving resistance is high the driving dynamics, i.e., a rapid reaction to changed operating conditions, is paramount. This is fulfilled by "shift-speed-orientated shifts". Thus in such a case, for example when driving from level ground onto an uphill stretch, a rapid reaction to the increasing driving resistance takes place in the form of a shift-speed-orientated downshift and this avoids an undesired slowing down of the motor vehicle.

In contrast, when the driving resistance is low, sufficient latitude is available for following a superimposed driving strategy and this can best be attained by "target-speed-orientated shifts". For example, by controlling the gear shifts appropriately, the drive engine can be kept largely within a speed range in which its specific fuel consumption is low, so enabling the motor vehicle to be operated particularly economically.

Since the driving resistance of a motor vehicle, especially a commercial vehicle, is decisively influenced by the inclination of the road in the driving direction and by the loading condition or mass of the vehicle, it is expediently provided that while driving the road inclination is continuously determined and a gear shift is carried out in the "target-speed-orientated shift" mode when driving on level ground or downhill, and in the "shift-speed-orientated shift" mode when driving uphill.

In addition, it is advantageous for the loading condition or mass of the motor vehicle to be continuously determined and for a shift to be carried out in the "target-speed-orientated shift" mode under low load or when the mass of the vehicle is low, and in the "shift-speed-orientated shift" mode under heavy loading or when the vehicle mass is high.

Likewise, the current load situation of the drive engine influences the driving dynamics and the fuel consumption of the motor vehicle. Accordingly, it is also expediently provided that while driving, the load condition of the drive engine is continuously determined, and that if the drive engine is operating under part load at the time a "target-speed-orientated shift" is carried out, whereas if the drive engine is operating under full load, a "shift-speed-orientated shift" is carried out.

Finally, the available latitude for transmission control is also influenced by the driver's power demand at the time. It is therefore advantageously provided that while driving, the driver's power demand is also continuously determined and that when the driver's power demand is low a gear shift is carried out as a "target-speed-orientated shift" and when the driver's power demand is high it is carried out as a "shift-speed-orientated shift". In this, it can be provided in particular that a downshift initiated by actuating the kick-down switch is carried out as a "shift-speed-orientated shift" so that the downshift takes place spontaneously, as expected by the driver.

Advantageously, in at least one of the shift types and preferably in both shift types, the shift mode "comply with a gear-step specification" and the shift mode "fully utilize the available speed range" are provided, such that immediately before a gear shift it is decided as a function of at least one operating parameter in which shift mode the shift is to be carried out.

In this context, the shift mode "comply with a gear-step specification" means that a gear-step specification determined for a given driving situation is complied with so far as possible. For example, in the case of a commercial vehicle equipped with a stepped gear transmission whose gear steps are small, when driving on level ground with low load a gear-step specification G3-G6-G8-G11-G12 with the third gear G3, the sixth gear G6, etc., may be determined since the lower gears G1 and G2 are only needed for starting off and the intermediate gears G4, G5, G7, G9, G10 are only needed when driving uphill and downhill or when driving with a heavy load.

In this case it is expedient, before carrying out a shift in the "comply with a gear-step specification" shift mode, to check whether the associated speed limits, i.e., in the case of a "shift-speed-orientated shift", the target-speed limits and in a "target-speed-orientated shift", the shift-speed limits, would be exceeded. If the speed limits would indeed be exceeded, then the gear step envisaged is reduced until the speed limits concerned are complied with. By virtue of the gear step specification, the gear step of the shift can even be smaller than the largest possible gear step permitted within the speed limits.

In the shift mode "fully utilize the available speed range", in contrast, the gear shift in question is always carried out with the largest possible gear step permitted within the speed limits.

The shift mode is determined independently of the shift type, preferably as a function of the load condition and the engine speed of the drive engine. For this, it is expediently provided that while driving, the load condition and the speed of the drive engine are continuously determined, and that if the drive engine is working under full load and at a low engine speed or when the speed of the drive engine is high, a shift is carried out in the "fully utilize the available speed range" shift mode, whereas if the engine speed is intermediate the shift takes place in the "comply with a gear-step specification" shift mode.

This ensures that unfavorable operating conditions of the drive engine, such as operating at full load with an extremely low engine speed or operating at an extremely high engine speed, are exited by the largest possible speed margin by way of the largest possible gear step in each case. It is also ensured that if the engine speed is intermediate, a driving strategy determined implicitly by the gear step specification, which can be aimed for example at low fuel consumption, is complied with.

In simply automated variable-speed transmissions, a gear shift is necessarily associated with a traction force interruption during which, in the drive train on the drive output side, a speed change occurs which is negative when the driving resistance is positive, i.e., such as to slow down the motor vehicle and is positive when the driving resistance is negative, i.e., such as to drive the motor vehicle onward. To a lesser extent, such a gear-shift-related speed change also takes place in automated change-under-load transmissions, such as dual-clutch transmissions and automatic planetary transmissions since, in these stepped gear transmissions, owing to transmission-interval stresses and friction losses during a gear shift, there is some faltering of the torque on the output side as a rule.

To take this effect into account, when determining the target gear and the shift speed, it is expediently provided that before a gear shift the effective driving resistance during the shift is determined and the resulting speed change on the drive output side is calculated, and that using this speed change the target speed is corrected during a "shift-speed-orientated shift" and the shift speed is corrected during a "target-speed-orientated shift".

Accordingly, for a "shift-speed-orientated shift" the target speed is reduced when the driving resistance is high when driving uphill, and increased when the driving resistance is low when driving downhill.

In contrast for a "target-speed-orientated shift", the shift speed is correspondingly increased when the driving resistance is high and reduced when the driving resistance is low.

During this, if the relevant speed limits are exceeded, i.e., in a "shift-speed-orientated shift", the target-speed limits or in a "target-speed-orientated shift", the shift speed limits, then the gear step envisaged must be reduced by at least one gear, i.e., the shift must be carried out for an upshift to a lower gear and for a downshift to a higher gear than envisaged.

BRIEF DESCRIPTION OF THE DRAWINGS

The invention will now be described, by way of example, with reference to the accompanying drawings in which.

DETAILED DESCRIPTION OF THE INVENTION

Figure 1:
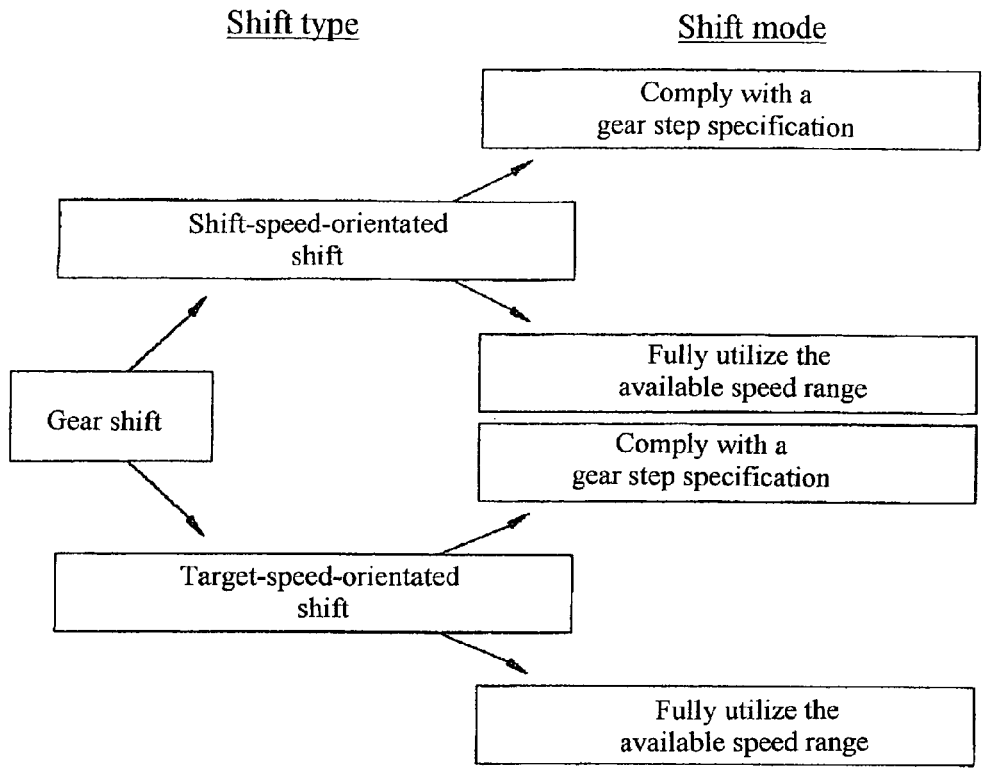
FIG. 1 is a synopsis to indicate the degrees of freedom of the method according to the invention.

As can be seen in FIG. 1, in the method according to the invention, two types of gear shifts are available and, in each case, two shift modes, where a corresponding determination of the shift speed, i.e., the engine speed at which the shift is initiated, the target gear to be engaged as a result of the shift, and the target speed, i.e., the engine speed reached at the end of the shift, a gear shift can be better adapted to the current driving and operating conditions than with previous shift control methods.

For a "shift-speed-orientated shift", the shift speed n_schalt is determined first. Starting from the shift speed n_schalt, the gear step and hence the target gear and the target speed n_ziel are then determined. In doing this, the shift speed n_schalt and the target speed n_ziel must lie within a speed range delimited by a shift speed limit n_schalt_grenz and a target speed limit n_ziel_grenz. This speed range is specified by the control program of the stepped gear transmission as the permissible operating range of the drive engine. In extreme cases, it may be the same as the speed range between the minimum acceptable and the maximum acceptable speed of the drive engine. Usually, however, the speed range is narrower than that and can correspond to the speed range in which the specific fuel consumption of the engine is low or the speed range in which a high drive engine torque is obtained.

In a "shift-speed-orientated shift", the shift speed n_schalt is usually identical to the shift speed limit n_schalt_grenz, but it can also be different from the latter. Owing to the discrete transmission ratio steps between the gears, in the target gear determined the target speed limit n_ziel_grenz is, as a rule, not reached, but rather the target speed n_ziel is usually above the target speed limit n_ziel_grenz in an upshift and below it in a downshift.

Figure 2:
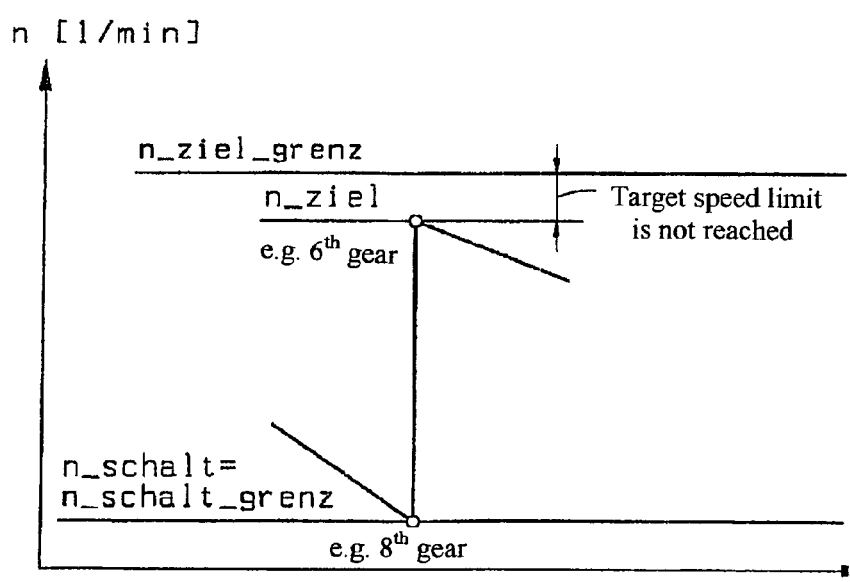
FIG. 2 is a speed diagram to illustrate shift-relevant speeds, considering the example of a downshift.

FIG. 2 illustrates a "shift-speed-orientated shift", considering the example of a downshift. The Figure shows the variation of an engine speed n with a time t from a downshift from the eighth gear G8 down to sixth gear G6. The gear shift is initiated when the shift speed n_schalt is reached and, in this case, the shift speed n_schalt can correspond to the shift speed limit n_schalt_grenz applicable for this one gear shift or for several similar shifts. Owing to the discrete transmission ratio change between G8 and G6, the target speed limit n_ziel_grenz is not reached, rather the target speed n_ziel obtained in the sixth gear G6 is lower than the target speed limit n_ziel_grenz.

In contrast, in a "target-speed-orientated shift", the target speed n_ziel is determined first and starting from that, the gear step and hence the target gear and the shift speed n_schalt are determined correspondingly. Once again, the relevant shift speed limit n_schalt_grenz and target speed limit n_ziel_grenz must be complied with, i.e., they must not be exceeded.

In a "target-speed-orientated shift", the target speed n_ziel is usually identical to the target speed limit n_ziel_grenz, but may also be different from it. Owing to the discrete steps between the gears, starting from the shift speed limit n_schal_grenz, the target speed n_ziel in the target gear determined is as a rule not reached, rather the shift speed n_schalt must be changed in the direction toward the target speed limit n ziel-grenz in order for the target speed n_ziel to be reached at the end of the gear shift.

In both shift types, the shift modes "comply with a gear-step specification" and "fully utilize the available speed range" are, in each case, additionally available (see also FIG. 1). In the shift mode "comply with a gear-step specification", a gear step specification established for a given driving situation is complied with, insofar as the respective speed limit, i.e., in a "shift-speed-orientated shift", the target speed limit n_ziel_grenz and in a "target-speed-orientated shift", the shift speed limit n_schalt_grenz, is complied with. If the speed limit concerned is exceeded, the gear step envisaged is then reduced in steps until the speed limit is complied with. In contrast, in the shift mode "fully utilize the available speed range", the shift in question is carried out with the largest possible gear step as defined by the speed limits.

Since both the shift type and the shift mode are selected as a function of current operating parameters before a gear shift is carried out, the shift is optimally adapted to the current driving situation.

Figure 3:
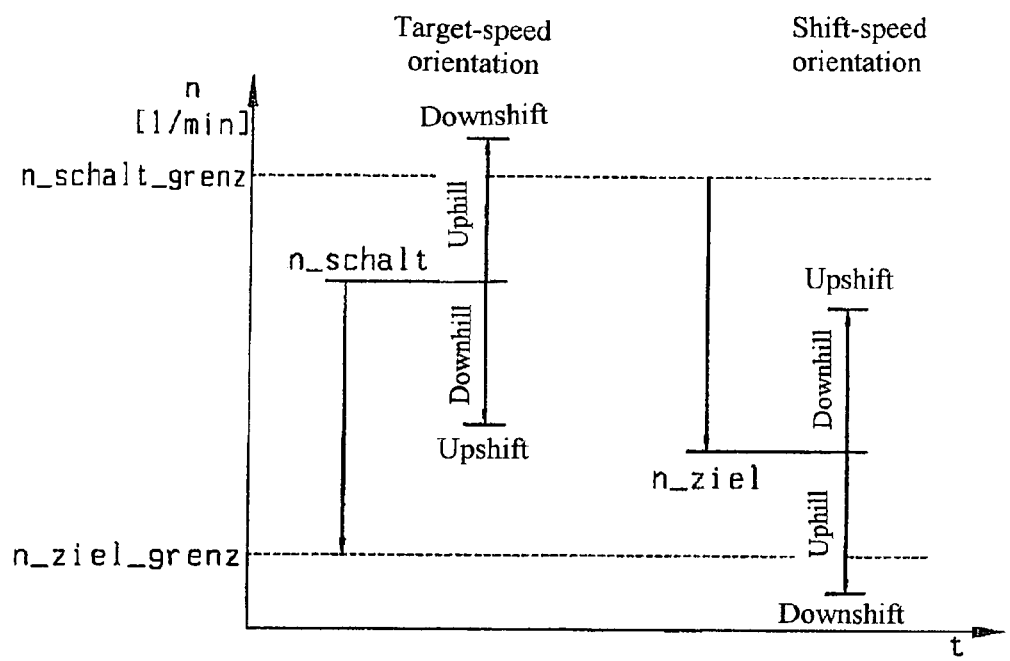
FIG. 3 is a speed diagram to show two shift types, considering the example of an upshift.
Figure 4:
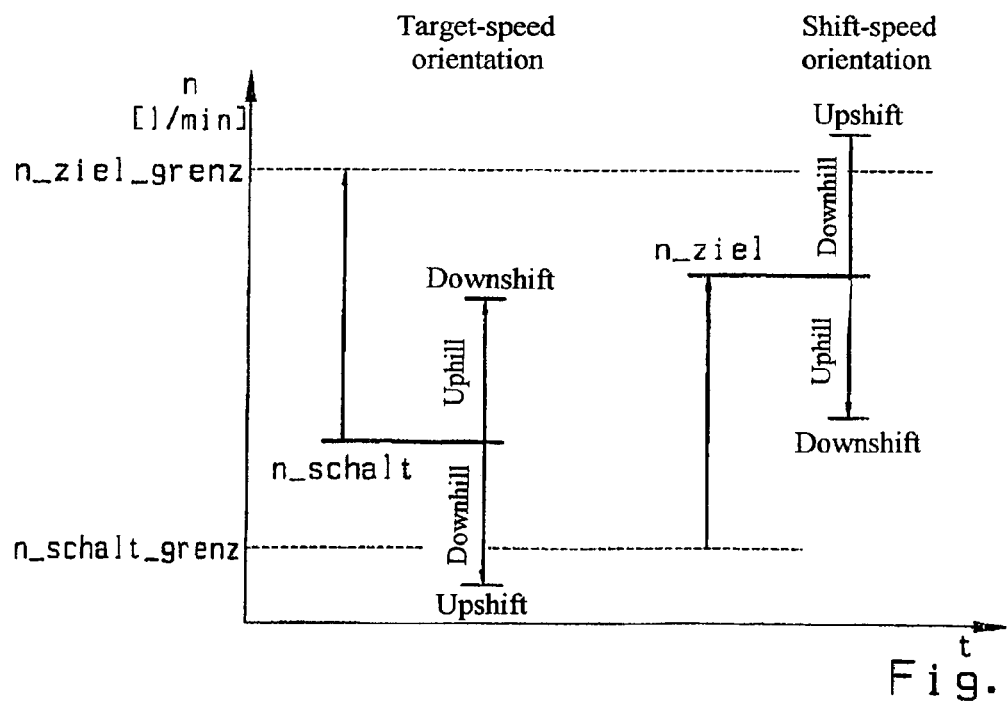
FIG. 4 is a speed diagram to illustrate two shift types, considering the example of a downshift.

Considering the influence of road inclination as an example, this is illustrated in FIG. 3 for an upshift and in FIG. 4 for a downshift, in each case for a "target-speed-orientated shift" and for a "shift-speed-orientated shift".

In the target-speed-orientated upshift, according to FIG. 3, owing to the discrete transmission ratio steps available the shift speed n_schalt is lower than the shift speed limit n_schalt_grenz, in order to reach the target speed limit n_ziel-_grenz in the target gear without any topographical influence. However, since during the traction-force-free phase of the gear shift, the motor vehicle slows down when moving uphill and accelerates when moving downhill, and a corresponding speed change of the output shaft of the stepped gear transmission takes place in order to compensate for this, i.e., in order still to reach the target speed limit n_ziel_grenz by way of the same shift, the shift speed n_schalt is increased when driving uphill and reduced when driving downhill. In the extreme case, to do this a previous downshift may be necessary when driving uphill and a previous upshift when driving downhill.

The analogous relationship is illustrated in FIG. 4 for a target-speed-orientated downshift.

In the shift-speed-orientated upshift according to FIG. 3, owing to the discrete transmission ratio steps available, the target speed n_ziel is higher than the target speed limit n_ziel_ grenz and for that reason, without any influence of road topography, the target speed limit n_ziel_grenz is not reached. When driving uphill, the target speed n_ziel decreases because of the deceleration of the motor vehicle during the gear shift. When driving downhill, the target speed n_ziel increases because of the acceleration of the motor vehicle during the gear shift. In this case when driving up a steep hill, a previous downshift may be needed in order to avoid falling below the target speed limit n_ziel_grenz in the target gear. Likewise when driving down a steep hill, a previous upshift may be needed in order to prevent the speed in the target gear from increasing too much.

The analogous relationship is shown in FIG. 4 for a shift-speed-orientated downshift.

REFERENCE NUMERALS

G1 first gear
second gear
G3 third gear
G4 fourth gear
G5 fifth gear
G6 sixth gear
G7 seventh gear
G8 eighth gear
G9 ninth gear
G10 tenth gear
G11 eleventh gear
G12 twelfth gear
n speed, engine speed
n_schalt shift speed
n_schalt_grenz shift speed limit
n_ziel Target speed
n_ziel_grenz target speed limit
t time

The invention claimed is:

1. A method for controlling gear shifts in an automated stepped gear transmission of a motor vehicle in which operating parameters of the motor vehicle are detected and evaluated for initiating and carrying out a gear shift from a currently engaged gear to a target gear, the method comprising the step of:
before a shift in each case a shift speed (n_schalt) for initiating the shift and a target gear are determined, providing either a shift-speed-orientated shift and a target-speed-orientated shift, and
immediately before a gear shift, deciding, as a function of at least one of the operating parameters, whether to carry out the shift as either the shift-speed-orientated shift or the target-speed-orientated shift;
continuously determining, while driving, a driving resistance of the motor vehicle and carrying out the gear shift as the target-speed-orientated shift, if the driving resistance is relatively low, and carrying out the gear shift as a shift-speed-orientated shift, if the driving resistance is relatively high.

2. The method according to claim 1, further comprising the step of continuously determining, while driving, the driving resistance of the motor vehicle based on an inclination of a driving surface in a direction of vehicle travel and either a loading condition or a mass of the motor vehicle.

3. The method according to claim 1, further comprising the step of continuously determining, while driving, a road inclination and carrying out the gear shift as a target-speed-orientated shift, if driving on one of level ground and downhill, and carrying out the gear shift as a shift-speed-orientated shift when driving uphill.

4. The method according to claim 1, further comprising the step of continuously determining, while driving, one of a load condition and a mass of the motor vehicle, and carrying out the gear shift as the target-speed-orientated shift, if the one of the loading and the vehicle mass is low, and carrying out the gear shift as a shift-speed-orientated shift, if the one of the loading and the vehicle mass is high.

5. The method according to claim 1, further comprising the step of continuously determining, while driving, a load condition of the drive engine and carrying out the gear shift as the target-speed-orientated shift, if the drive engine is operating under part-load at a time the gear shift is carried out, and carrying out the gear shift as the shift-speed-orientated shift, if the drive engine is operating under full load at the time the shift is carried out.

6. The method according to claim 1, further comprising the step of continuously determining, while driving a power demand of a driver, and carrying out the gear shift as the target-speed-orientated shift, if the power demand of the driver is low, and carrying out the gear shift as the shift-speed-orientated shift, if the power demand of the driver is high.

7. The method according to claim 1, further comprising the step of continuously checking, while driving, an actuation condition of a kick-down switch, and carrying out a downshift as the shift-speed-orientated shift by actuation of the kick-down switch.

8. The method according to claim 1, further comprising the step of providing one of a shift mode comply with a gear-step specification and a shift mode fully utilize the available speed range with at least one of the two shifts and deciding, directly before the gear shift, which shift mode is to be carried out as a function of at least one of the operating parameters.

9. The method according to claim 8, further comprising the step of checking, before carrying out the gear shift in the shift mode comply with a gear-step specification if an associated speed limit will be exceeded by the gear shift, and reducing the gear step in steps until the speed limit is complied with.

10. The method according to claim 8, further comprising the step of continuously determining, while driving, a load condition and an engine speed of the drive engine, and carrying out a gear shift in the shift mode fully utilize the available speed range when one of the drive engine is operating under full load and the engine speed is low and when the engine speed is high, and carrying out the gear shift in the shift mode comply with a gear-step specification, if the engine speed is intermediate.

11. The method according to claim 1, further comprising the step of determining, before a gear shift, the driving resistance existing during the gear shift and calculating a speed change on the drive output side that results from the gearshift, and correcting a target speed (n_ziel) using the speed change on the drive output side in the shift-speed-orientated shift and correcting a shift speed (n_schalt) using the speed change on the drive output side in the target-speed-orientated shift.

12. The method according to claim 11, further comprising the step of reducing the target speed (n_schalt) in the shift-speed-orientated shift when driving resistance is high and increasing the target speed (n_schalt) in the shift-speed-orientated shift when the driving resistance is low.

13. A method for controlling gear shifts in an automated stepped gear transmission of a motor vehicle in which operating parameters of the motor vehicle are detected and evaluated for initiating and carrying out a gear shift from a currently engaged gear to a target gear, the method comprising the step of:
before a shift in each case a shift speed (n_schalt) for initiating the shift and a target gear are determined, providing either a shift-speed-orientated shift and a target-speed-orientated shift, and immediately before the gear shift, deciding, as a function of at least one of the operating parameters, whether to carry out the shift as either the shift-speed-orientated shift or the target-speed-orientated shift; and increasing the shift speed (n_schalt) in the target-speed-orientated shift when the driving resistance is high and reducing the shift speed (n_schalt) in the target-speed-orientated shift when the driving resistance is low.

14. A method for controlling gear shifts in an automated stepped gear transmission of a motor vehicle, the method comprising the steps of:

monitoring at least one of a motor vehicle's driving resistance of the motor vehicle, a road inclination, a mass of the motor vehicle, a current engine speed, and a power demand of a driver;

evaluating the at least one of the driving resistance, the road inclination, the mass of the motor vehicle, the current engine speed, and the power demand for initiating and carrying out a gear shift from a currently engaged gear to a target gear;

deciding whether to employ one of a shift-speed-orientated shift and a target-speed-orientated shift based on the evaluation of the driving resistance, the road inclination, the mass of the motor vehicle, the current engine speed, and the power demand; and carrying out the shift using one of the shift-speed-orientated shift and the target-speed-orientated shift.

* * * * *